US012454107B2

(12) United States Patent
Abstreiter (10) Patent No.: US 12,454,107 B2
(45) Date of Patent: Oct. 28, 2025

(54) METHOD FOR TREATMENT OF ELEMENTS OBTAINED BY AN ADDITIVE MANUFACTURING PROCESS

(71) Applicant: Technische Universität München, Munich (DE)

(72) Inventor: Tobias Abstreiter, Lengdorf (DE)

(73) Assignee: Technische Universität München, Munich (DE)

( * ) Notice: Subject to any disclaimer, the term of this patent is extended or adjusted under 35 U.S.C. 154(b) by 246 days.

(21) Appl. No.: 17/875,023

(22) Filed: Jul. 27, 2022

(65) Prior Publication Data

US 2023/0097288 A1  Mar. 30, 2023

Related U.S. Application Data

(63) Continuation of application No. 17/047,839, filed as application No. PCT/EP2019/059819 on Apr. 16, 2019, now abandoned.

(30) Foreign Application Priority Data

Apr. 16, 2018  (EP) .................................... 18167627
Jun. 30, 2018  (EP) .................................... 18181048
Nov. 12, 2018  (EP) .................................... 18205801

(51) Int. Cl.
*B29C 71/00*   (2006.01)
*B29C 64/153*  (2017.01)
(Continued)

(52) U.S. Cl.
CPC ........ *B29C 71/0009* (2013.01); *B29C 64/153* (2017.08); *B29C 64/205* (2017.08);
(Continued)

(58) Field of Classification Search
CPC . B29C 71/0009; B29C 64/153; B29C 64/205; B29C 64/35; B33Y 10/00; B33Y 40/20; B33Y 70/00; B29K 2077/00
See application file for complete search history.

(56) References Cited

U.S. PATENT DOCUMENTS 5,248,456 A       9/1993  Evans, Jr.
6,019,925 A  *    2/2000  Diamantoglou ....... B01D 71/12
                                                       264/203

(Continued)

FOREIGN PATENT DOCUMENTS

DE    102009047237    11/2012
IT    TV20120170      8/2012
(Continued)

OTHER PUBLICATIONS

International Search Report and Written Opinion were mailed on Aug. 30, 2021 by the International Searching Authority for International Application No. PCT/EP2019/059819 filed on Apr. 16, 2019 and published as WO2019201932 (Applicant—Technische Universität München) (10 pages).

(Continued)

*Primary Examiner* — Nahida Sultana
(74) *Attorney, Agent, or Firm* — Ballard Spahr LLP (57) ABSTRACT

A method for treatment of elements obtained by an additive manufacturing process comprises applying on the element a treating agent in liquid or gaseous form.

21 Claims, 2 Drawing Sheets

(51) Int. Cl.
    *B29C 64/205*     (2017.01)
    *B29K 77/00*     (2006.01)
    *B33Y 10/00*     (2015.01)
    *B33Y 40/20*     (2020.01)
    *B33Y 70/00*     (2020.01)

(52) U.S. Cl.
    CPC ............... *B33Y 10/00* (2014.12); *B33Y 40/20* (2020.01); *B29K 2077/00* (2013.01); *B33Y 70/00* (2014.12)

(56) References Cited

U.S. PATENT DOCUMENTS

| | | | |
|---|---|---|---|
| 6,713,125 B1* | 3/2004 | Sherwood | B33Y 70/00 427/430.1 |
| 8,075,300 B2 | 12/2011 | Zinniel | |
| 9,126,229 B2* | 9/2015 | Tahara | H01L 21/02063 |
| 2002/0171176 A1 | 11/2002 | Hanna | |
| 2005/0220983 A1 | 10/2005 | Hayes | |
| 2007/0292703 A1* | 12/2007 | Ikuta | C08J 5/12 524/502 |
| 2008/0169585 A1* | 7/2008 | Zinniel | B29C 71/0009 264/293 |
| 2009/0321972 A1 | 12/2009 | Zinniel | |
| 2012/0193835 A1* | 8/2012 | Suzuki | B32B 27/32 264/459 |
| 2016/0375469 A1 | 12/2016 | Tafoya | |
| 2017/0028432 A1 | 2/2017 | Miller | |
| 2017/0173872 A1* | 6/2017 | McCall | B29C 64/124 |
| 2018/0178241 A1 | 6/2018 | Luo | |
| 2018/0237610 A1* | 8/2018 | Watanabe | C04B 35/46 |
| 2018/0344632 A1 | 12/2018 | Deng | |
| 2019/0375158 A1* | 12/2019 | Crabtree | B29C 64/35 |
| 2021/0179759 A1* | 6/2021 | Lee | C04B 35/14 |

FOREIGN PATENT DOCUMENTS

| | | |
|---|---|---|
| WO | WO 2016/201614 | 12/2016 |
| WO | WO 2017/167691 | 5/2017 |
| WO | WO 2018/071428 | 4/2018 |

OTHER PUBLICATIONS

International Preliminary Report on Patentability was issued on Oct. 20, 2020 by the International Searching Authority for International Application No. PCT/EP2019/059819 filed on Apr. 16, 2019 and published as WO2019201932 (Applicant—Technische Universität München) (7 pages).

International Search Report and Written Opinion were mailed on Mar. 17, 2020 by the International Searching Authority for International Application No. PCT/EP2019/079116, filed on Oct. 24, 2019 and published as WO 2020/099096 on May 22, 2020 (Applicant—Technische Universität München) (11 Pages).

\* cited by examiner

METHOD FOR TREATMENT OF ELEMENTS OBTAINED BY AN ADDITIVE MANUFACTURING PROCESS

CROSS-REFERENCE TO RELATED APPLICATIONS

This application is a continuation of U.S. application Ser. No. 17/047,839 filed Oct. 15, 2020, which is a U.S. National Phase Application of International Application No. PCT/EP2019/059819, filed Apr. 16, 2019, which claims priority to European Application No. 18167627.1, filed Apr. 16, 2018, European Application No. 18181048.2, filed Jun. 30, 2018, and European Application No. 18205801.6, filed Nov. 12, 2018, each of which are hereby incorporated by reference in their entirety.

The present invention is concerned with a method for treatment of elements obtained by an additive manufacturing process.

Additive processes for preparing elements for various applications have become very popular. Additive processes, also known as three-dimensional (3D) printing processes are available in different forms starting from building materials in liquid, viscous, solid or powder form. Fused filament fabrication (FFF) uses a continuous filament of a thermoplastic material which in molten form is deposited on the growing workpiece.

Another type of 3D printing processes uses building material in powder form which is selectively solidified by sintering, melting, fusing, or binding the powder at selected sites for producing elements. Elements are built by depositing powdery material layer after layer. The building material can be a polymer, metal, ceramic, or a composite material. One class of polymers that is useful for additive manufacturing is the class of polyamide polymers and polyamide blends. An element is formed by applying a layer of material in powder form to a building platform, and then based on computer generated data selectively heating or bonding the powder in those parts of the layer which shall become part of the element. For example the powder can be fused or melted by infrared radiation, sintered by a laser beam, or bonded by a binder material. The platform is then lowered, another layer of material in powder form is added and again melted, fused, or bonded. These steps are repeated until the element has been built.

Selective heating can be obtained by a laser beam, as for example in selective laser sintering (SLS), or by infrared radiation, such as in multi-jet fusion (MJF) processes including high speed sintering (HSS). Selective solidifying can be obtained by binder-jetting processes among others. The main principle of these solidifying processes is the use of a powder which is treated to solidify at predetermined sites to yield the product. Additive sintering processes are particularly useful for producing elements with delicate structures, fine channels and/or complex forms.

Building materials used in additive processes are often polymers and the quality of the elements obtained in these processes depends on the polymer used. A class of polymers that is highly desirable for additive manufacturing is polyamide, a highly robust polymer which is resistant to the environment, and has good mechanical properties. Therefore, polyamide in powder form is a useful building material and is used in multi-jet fusion (MJF), HSS and selective laser sintering (SLS) processes. Other known processes use light for solidifying photoreactive liquid resin, for example laser-based stereolithography (SLA) and digital light processing (DLP). Another known process is Multijet-Modeling (MJM) where material is heated and "trickled" out of Nano-Jets on the build platform, hardened and cured with UV light.

Other materials that are useful in sintering processes are thermoplastic polymers like thermoplastic elastomers (TPE), such as thermoplastic polyurethane (TPU), thermoplastic polyamides (TPA), thermoplastic copolyester compounds (TPC) among others. Those polymers have desirable properties, however when used for 3D printing the elements obtained often have a rough surface with a roughness that can be up to 20 µm and more.

Although additive manufacturing processes as known in the art are very useful because they save time and cost compared to manufacturing processes using traditional methods, one disadvantage of these very useful techniques is that the surface smoothness of the obtained objects is not satisfying, the surface of the elements obtained has a surface roughness $R_a$ which, depending on the manufacturing process used, can be in the range of up to 10 µm or even up to 20 µm. Therefore, for many applications it is necessary to smoothen the surface before the elements can be used. Methods for smoothening the surface are known, but all have disadvantages and are detrimental to the structure and/or mechanical strength of the elements.

US 2017/0327658 discloses a process for surface treatment of an object wherein the object is dipped into concentrated acid to impregnate the surface and then is heated to a temperature between 14° and 180° C., until melting of the surface is obtained. This treatment is very harsh and can result in formation of holes or cracks in the surface.

DE 10 2014 102 137 discloses a process for treatment and dyeing of surfaces wherein an object is dipped into a hot solution comprising a dye for up to 6 hours wherein the dye solution has a temperature between 6° and 180° C. The process comprises at least three steps wherein in a first step the objects are pretreated by milling, grinding, or polishing. After this step formic acid vapor can be applied to further smoothen the surface. In a second step the elements are dyed by using a mixture of dye and water having a temperature of at least 60° and up to 180° C. In a third step the surface of the object is impregnated and/or sealed by applying a polymer solution. This process has disadvantages. Mechanical treatment such as milling, grinding and polishing, and the use of formic acid at high temperatures, can damage or deteriorate elements or parts thereof. Such treatment is particularly undesirable for elements having delicate parts, channels, holes etc., because those parts or sites can be destroyed or at least impaired or damaged. On the other hand, the use of formic acid vapor is undesirable; precautions have to be taken to avoid that formic acid vapor escapes into the atmosphere.

As on the one hand elements obtained by additive manufacturing processes are very promising and are produced in increasing amounts, and on the other hand a high quality surface is necessary, it was an object of the present invention to provide a process for smoothening, refining or finishing the surface of an element obtained by an additive manufacturing process which does not or essentially not damage the surface, maintains the complexity of the structure and form of the element, can be carried out in short time and avoids the use of milling, grinding, and polishing steps. Moreover, it was an object of the present invention to provide a method for treating elements obtained by additive manufacturing processes which can be carried out at room temperature or slightly increased temperature to avoid the use of high temperatures. Furthermore, it was the object of the present invention to provide a method for treating elements obtained by additive manufacturing processes, that are made from materials, such as thermoplastic elastomers, that cannot or hardly be smoothened by mechanical grinding. In other words it was the object of the present invention to provide a method for treating elements that can be used for many different types of polymers and can be used for many types of treatment of elements surfaces, such as smoothening, refining, finishing, and functionalizing.

It was found that it is possible to provide elements obtained by an additive manufacturing process with a smooth surface by treating the elements with a process as defined in claim 1, which allows smoothening surfaces of elements with very delicate parts, with high complexity, with channels, holes and fine structures in a timely manner and at convenient temperatures. Moreover, it is possible to treat the surface of those elements to provide it with desirable functions. The parts have high quality and the mechanical strength is not or hardly impaired by the method of the present invention.

The method of the present invention can be used for elements that have been obtained by additive manufacturing processes, wherein a polymer is used as building material to form an element. Valuable building material are different types of thermoplastic polymers. such as different types of polyamide and polymers like PMMA, POM, PC, PEI, or PSU, or a thermoplastic elastomer (TPE), such as thermoplastic polyurethane (TPU), thermoplastic polyamide (TPA), thermoplastic copolyester compound (TPC), or thermoplastic styrene block copolymers (TPS), such as styrene/ethylene/butylene/styrene block copolymer (SEBS). Other materials for preparing elements as long as the material dissolves or softens in the presence of a treatment agent as defined in the claims, comprising a mono- or polyvalent alcohol, for example ethanol or HFIP or an alcohol comprising mixture.

Elements that can be treated are those that have been built as described above for example by MJF, HSS, SLS, SLA, DFP, FFF, or binder jetting processes using polymer powder as building material and an energy source like laser or infrared radiation, heating etc. for solidifying, to create a solid structure from the powder. Examples are binder jetting processes using PMMA as building material and a binder for creating the solid structure, or using PC, POM, PSU, or PEI as building material and an FFF process for creating the solid structure. The method of the present invention surprisingly is useful for treating elements prepared from thermoplastic polymer powder. Also elements obtained with DLP, SLA and MJM processes can be treated by the method of the present invention. Powder based printing processes like MJF, HSS and SLS are particularly useful for preparing complicated elements with very delicate structures, as the powder bed supports the elements. The elements obtained thereby can be treated with the method of the present invention.

The method as defined in the claims is versatile and allows adapting the conditions according to the properties that are desirable for an element. Moreover, the method of the present invention provides a surface that is very well suited for being dyed or functionalised.

BRIEF DESCRIPTION OF THE DRAWINGS

FIG. 2 shows another device that is also useful for treating elements according to the present invention. The device comprises a chamber for contacting elements with vapor, at least one element contact area, a dosing unit for solvent, which is the treating agent, comprising a solvent feed line for feeding treating agent into chamber from a treating agent container, and a dosing means, and optionally comprises at least one distributor, a withdrawal unit comprising a pump, and/or a recovery unit comprising at least one filter unit or a trap.

DEFINITIONS

The term "additive manufacturing" as it is used in the present application, comprises various processes in which polymer material, in particular polymer powder, is processed under computer control to create three-dimensional objects. It includes sintering as well as binder jetting or FFF processes. It includes processes where a polymer powder is first melted, fused, sintered, or bonded and then solidified at predetermined sites. In other words, it is a process, where a solid element is formed layer by layer from materials like thermoplastic elastomers or polyamides. It also comprises light induced processes like SLA, DLP and MJM. In particular, the term "additive manufacturing" as it is used in the present application, comprises a process where a polymer powder is solidified in a predetermined shape or pattern to build an object or element.

The term "powder-based additive manufacturing" refers to additive manufacturing processes that use polymers in powder form as starting material.

The term "element" when used in this application refers to a product that has been obtained by additive manufacturing. An element can be made or can be comprised of any usable polymer.

The term "polymer" comprises polymers obtained from one type of monomer or from two or more types of monomers. It comprises homopolymers, copolymers, blockpolymers and mixtures of different types of polymers.

The term "polyamide element" when used in this application refers to an element that has been obtained by an additive manufacturing process by using polyamide or a material comprising polyamide as building material.

The term "polyamide" comprises one type of polyamide, a mixture of two or more types of polyamide, polyamide copolymers such as PA6/PPO, as well as polyamide blends. It also comprises polymers known as "nylon".

The term "polyamide powder" comprises one type of polyamide powder or a powder mixture of two or more types of polyamide as well as polyamide blends, i.e. blends of one or more polyamide powders with other powders, like other polymer powders, metal powders, ceramic powders, fibers, etc.

The term "thermoplastic polymer" comprises thermoplastic elastomers/(TPE), such as thermoplastic polyurethane (TPU), thermoplastic polyamides (TPA), thermoplastic polyetheramides such as PEBA among others. The term thermoplastic polymers also comprises polymers like ABS and PEI. In particular, the term comprises those thermoplastic polymers or elastomers, respectively, that are suitable for powder-based additive manufacturing processes.

The term "thermoplastic polymer powder" or "TPE powder" comprises one or more types of powder of thermoplastic polymers, such as a powder of one type of such a polymer or a powder mixture of two or more types of thermoplastic polymer powders as well as polymer blends, i.e. blends of one or more thermoplastic polymer powders with other powders, like other polymer powders, metal powders, ceramic powders, fibers, etc.

When a temperature is indicated for application of a liquid, the temperature refers to the temperature of this liquid. The application of a "liquid at x° C." means that the liquid has temperature x° C., when it is applied and that the temperature of the liquid is maintained for the indicated time period, for example by heating means, such as a heating bath.

The terms "room temperature" or "ambient temperature" refer to a temperature of 20° C.

When a temperature is indicated for application of a vapor, the temperature refers to the temperature in the container or vacuum unit, i.e. the environment of the element to be treated.

When the term "applying" or "application" is used with regard to the treatment with a treating agent like ethanol, hexafluoroisopropanol (HFIP), dichloromethane, tetrahydrofuran, this shall mean that the treating agent in liquid or gaseous form is applied on the element such that the element is fully or partially wetted or contacted by the treating agent. This can be obtained by means as known to the skilled person, for example by dipping elements into the treating agent such that the element is fully surrounded by the treating agent or such that selected parts are wetted by the treating agent. This can be achieved by using a device for vaporizing a solvent as described in detail below, or by laying elements in wells or containers and filling the wells or containers with the treating agent or in any other mode that is known to the skilled person. It is important that the treating agent contacts the whole surface of an element and can also flow into channels, holes etc., or, if this intended, contacts selected parts of the surface.

A time period for application of the treating agent is the time wherein the liquid or solvent has been brought into contact with the element until removal of the solvent, for example when applying solvent in vapor form it is the time from injecting it until withdrawing it. When using a liquid it is for example the time for dipping the element into the solvent. Although some solvent can still be present on the element after the "active" application time, i.e. after removal of the solvent or the element respectively, this is not deemed as application time.

The term "treating agent" refers to any compound or composition that is used for treating an element. A treating agent comprises at least one alcohol, wherein the alcohol can be monovalent or polyvalent. The treating agent can comprise more than one alcohol and/or further solvents and/or further compounds. The one or more alcohols and/or optionally one or more further solvent(s) can be in liquid or gaseous form.

An alcohol is any organic compound that carries at least one OH group. The term comprises monovalent and polyvalent, substituted or unsubstituted aliphatic $C_1$-$C_{10}$ alcohols or substituted or unsubstituted aromatic $C_6$ to $C_{12}$ alcohols or mixtures thereof. The substituent can be selected from halogen, $C_1$-$C_{10}$alkyl, a $C_6$ to $C_{12}$ aromatic group, such as phenyl. A monovalent alcohol is an organic compound carrying one OH group and can optionally have further substituents as defined before or functional groups like amino, carboxyl, ester. A monovalent alcohol for example can be selected from ethanol, propanol, isopropanol, butanol, benzyl alcohol, chlorobenzene, 2,2,2-trifluoroethanol, hexafluoroisopropanol or a mixture thereof.

A polyvalent alcohol is an organic compound carrying at least two OH groups and can optionally have further substituents or functional groups as defined before. Examples are glycol, glycerol, triethyleneglycol amongst others.

When it is generally referred to "alcohol" in this application, this term comprises at least one alcohol as defined above and also comprises a mixture of alcohols.

The term "treating agent comprising HFIP" includes HFIP as only solvent or a mixture of HFIP with at least one further solvent, that is compatible with HFIP, i.e. the term comprises HFIP or a mixture of HFIP with other solvents.

The term "solvent" when used in general can also refer to the treating agent in general, when the context allows.

The term "additional solvent" comprises a single organic solvent or a mixture of two or more solvents that are used in addition to the at least one alcohol. Furthermore, the term "solvent" comprises a solvent in liquid or gaseous form.

The term "plasticizer" refers to a compound that increases plasticity of a material, in particular that increases flexibility of polymers for example by decreasing attraction between polymer chains. Examples for plasticizers are aromatic esters such as phthalates, benzoates, aliphatic esters such as citrates, adipates, sebacates, cycloaliphatic esters such as cyclohexane dicarboxylic acid alkyl esters. The term "plasticizer" also comprises bio-based compounds like oil derived compounds, for example soybean oil derivatives, or essential oils like camphor.

The term "functionalizing agent" refers to an agent that adds or introduces a function to the element or the surface of the element, respectively. The function can be a chemical, physical, esthetical etc. function.

"Solidifying" of a powder can be obtained by fusing, sintering, melting, or binding a powder.

The term "chamber" when used in this application refers to a treatment chamber wherein the elements are treated. The chamber can be any type of a container that is suitable for the application of a liquid or a gas. It can for example be a vacuum chamber or a chamber comprising heating means like an external or internal microwave unit or ultrasound unit.

The surface roughness of a material or element refers to the texture on the surface. It is quantified by deviations in the profile, i.e. deviations in a direction that is normal to the surface. Measured values for the profile result from scanning the actual profile with a probe. Surface imperfections, such as cracks, scratches and dents, should not be part of the profile and should not be included in the measured value. Roughness parameters that are usually used are $R_a$—arithmetical mean roughness value, wherein the arithmetical mean of the absolute values of the profile deviations from the mean line of the roughness profile is measured, or $R_z$—mean roughness depth, where the mean value of i (usually i=5) profile deviations from i sampling length is measured.

In the present application, when it is referred to surface roughness, this refers to $R_a$ values, i.e. arithmetical mean roughness values except the context tells otherwise.

The method of the present invention comprises the treatment of elements by applying a treating agent. It has surprisingly been found that the surface of elements can be smoothened by applying a treating agent comprising at least one alcohol as defined before at a predetermined temperature and for a predetermined time period.

The method of the present invention is useful for any element that has been obtained by an additive manufacturing method from a polymer material, wherein the polymer material is softened or dissolved by a treating agent in liquid and/or gaseous form comprising at least one alcohol. In particular, the method of the present invention can be applied for any element that has been obtained by an additive manufacturing method from a polymer material that is softened and/or dissolved by the treating agent of the present invention at application temperature. Polymers that are used in additive manufacturing processes are known to the skilled person. Examples for polymers that can be used as building material to form an element are duroplastic or thermoplastic polymers. Materials that are particularly useful in additive manufacturing powder-based processes are thermoplastic polymers such as polyamides and thermoplastic elastomers (TPE). Examples of polymers and polymer classes that are useful are polyamide, acrylates such as polymethyl methacrylate (PMMA), polyoxy methylene (POM), polyethylene terephthalate (PET), polyethylene terephtalate glycol (PETG), polyether block amide (PEBA), poly carbonates (PC), polyethylene furanoate (PEF), polylactide (PLA), polyurethanes such as thermoplastic polyurethane (TPU), polysulfones (PSU) such as polyethersulfones (PESU), and polyphenylsulfones (PPSU), polyimides, polyetherimides (PEI), polyketones (PK), polyether ketone (PEK), such as polyether ether ketone (PEEK) and polyether ketone ketone (PEKK), styrene polymers and copolymers such as acrylonitrile butadiene styrene (ABS), acrylonitrile styrene acrylate (ASA), or triblock polymers of polystyrene and poly(ethylene oxide) blocks (ABA), or a thermoplastic polymer comprising polyetherimide and polycarbonate, which is available as Ultem 9085, or copolymers, blends, or mixtures of all above-mentioned materials. Examples for TPE are thermoplastic polyurethane (TPU), thermoplastic polyamides (TPA), among others. Furthermore, elements based on photopolymers can also be treated by the method of the present invention, i.e. elements that have been obtained with processes like stereolithography or polyjet where polymers are used for printing elements and are cured or post-cured, respectively, in a further step. It has been found that the method of the present invention can be used for this type of polymers also when the treating step is carried out before post-curing.

The method of the present invention is particularly useful for thermoplastic elements such as polyamide comprising elements and elements obtained from thermoplastic elastomers. Polyamide is a valuable building material and it is used in different types. Suitable polyamides are aliphatic, semi-aromatic and aromatic polyamides, for example polyamide 6 (PA6), polyamide 6.6 (PA6.6), polyamide 11 (PA11), polyamide 12 (PA12), PA 4.6 (PA4.6), polyamide 612 (PA612), polyphthalamide (PPA), or thermoplastic co-polyamides, or blended or filled polyamides such as a blend with metal powder, for example a blend of aluminum powder and polyamide powder that is available as alumide, or polyamide powder filled with particles like glass particles, or copolymers, blends, or mixtures thereof. Examples for thermoplastic elastomer powders are among others TPA, TPU, TPE, and TPS as outlined before, and mixtures thereof. These powders can also be blended with other polymer powders and/or with metal powder, particles, fibers etc.

Elements that can be smoothened by the method of the present invention can be for example those built as described above by MJF, HSS, SLS processes using polyamide powder as building material and an energy source like a laser or infrared radiation to create a solid structure from the powder, binder jetting processes using PMMA as building material and a binder for creating the solid structure, or using PC, POM, PSU as building material and an FFF process for creating the solid structure, or by light induced processes such as DLP, SLA, or MJM. MJF, HSS, and SLS are particularly useful for preparing complicated elements with very delicate structures, as the powder bed supports the elements.

The elements are treated according to the present invention with a treating agent which comprises at least one alcohol and can comprise two or more alcohols, wherein the alcohol(s) can be monovalent or polyvalent, and/or further solvents and/or additives. It has been found that alcohols are useful to treat the surface of elements obtained by additive manufacturing, in particular to smoothen and optionally to change properties of the surface like colour, gloss, structure, adhesiveness, anti-adhesiveness, electrostatic charge, electrical conductivity and/or to functionalize the surface or parts thereof. One or more alcohols can be used in liquid or gaseous form, depending on the polymer and the composition of the treating agent among others.

Suitable alcohols are substituted or unsubstituted aliphatic $C_1$-$C_{10}$ alcohols or substituted or unsubstituted aromatic alcohols or any mixture thereof.

Examples for aliphatic $C_1$-$C_{10}$ alcohols that are well-suited as treating agent are amongst others ethanol, hexafluoroisopropanol, triethyleneglycol, 2,2,2-trifluoro ethanol or any mixture thereof. Examples for aromatic $C_6$-$C_{12}$ alcohols that are well-suited as treating agent are amongst others benzyl alcohol and chloro benzene.

For some polymers smoothening with an alcohol of the present invention is difficult. It has been surprisingly found that the smoothening action of an alcohol in some cases can be improved by adding at least one plasticizer. Therefore, for those elements that are difficult to smoothen or for which high temperature and/or high pressure were necessary, the addition of at least one plasticizer improves the results and might lower temperature and/or pressure to be applied. Thus, in these cases the treating agent comprises at least one alcohol and at least one plasticizer.

Plasticizers are well-known to the skilled person. Preferably those are used that are not toxic. Suitable are in particular plasticizers that are compatible with the polymer used for preparing the elements. Examples for plasticizers are aromatic esters, aliphatic esters, cycloaliphatic esters, and bio-based compounds, such as phthalates, benzoates, citrates, adipates, sebacates, cyclohexane dicarboxylic acid alkyl esters, fatty oils, and essential oils.

The plasticizer is used in an amount that provides for an improvement of the desired effect. An amount of about 0.1 to about 65 weight-%, such as about 1 to about 35 weight-% based on the total weight of the treating agent, can be used.

Furthermore, the treating agent can comprise at least one additional solvent to improve the smoothening effect. Without being bound by theory it is assumed that the additional solvent has the function of a solubilizer, i.e. supports and fosters the smoothening action of the alcohol. Therefore, the additional solvent can be a solvent that is compatible with the polymer used for preparing the element. In this case the treating agent comprises at least one alcohol and additionally at least one solvent. Solvents that have been found useful can be selected from esters, ethers, and ketones. Examples are DMSO or γ-butyrolactone.

The amount of the additional solvent depends on the compatibility and on the effect. It can be as few as about 1 vol.-% or less and up to about 90 vol-% or more, such as up to about 75 vol.-%, for example about 15 to about 65 vol.-% based on the total volume of the treating agent. In the case of some polymers, like TPU and PEI it has been found that DMSO used as treating agent without alcohol can provide smooth surface.

The treating agent can comprise plasticizer and/or additional solvent. It has been found that when adding plasticizer to the treating agent the temperature used for smoothening can be decreased by up to 10° C. and a similar effect can be obtained as with a treating agent without plasticizer. In some cases the addition of a plasticizer allows smoothening where the elements did not react to a treating agent comprising only alcohol. Furthermore it has been found that sometimes fibers form when elements are treated with alcohol, but the fiber formation is reduced when a plasticizer has been added.

The time period for treating an element is dependent from various factors such as material, shape and size of the element to be treated, the type and form of treating agent, temperature and pressure applied, surface roughness of the element to be treated. In general the time period is in a range of about 1 second to about 60 minutes or more, for example about 5 seconds to about 45 minutes. A treatment of less than 1 second smoothening might not be sufficient. A time period of more than 60 minutes might damage the element. The treating agent comprising at least one alcohol can be applied in liquid or gaseous form. If the treating agent is applied in liquid form, the time period for application can be in a range from about 1 sec to about 45 min, for example about 5 seconds to about 30 minutes, such as about 1 to about 20 minutes.

An optimal time range for the smoothening step can be determined based on parameters like solvent to be used, polymer used for the element, temperature and pressure, and surface roughness. When a liquid solvent is used for a polymer like polyamide, a time range of about 30 seconds to about 10 minutes has been found suitable, for example when ambient conditions regarding temperature and pressure are used. When a solvent in gaseous form is used, a time range of about 1 to about 60 minutes, depending on type of polymer, type of element, pressure, temperature among others, can be used. When using elements made of polyamide a time range of about 2 minutes to about 45 minutes has been found suitable.

Depending on the material of the element the best suited treating agent can be identified. Some examples are described in detail below. The shape of the element has to be considered as delicate structures are more sensible to treatment than simple structures like cubes. For complex structures it can be preferred to use short treatment periods and repeat treatment steps, in other words apply the treating agent more than once. If the element has many channels, holes, delicate parts, it takes longer to smoothen the complete surface, whereas for a small element and/or an element with a simple shape, smoothening can occur faster, for example within 1 sec or a few seconds to about a few minutes when a liquid solvent is used.

The time period also depends on the type of treating agent, the more active a treating agent is, the shorter the treating period should be. Moreover, the treating time differs for applying a treating agent in liquid form or gaseous form. When a liquid is applied the treatment time usually is shorter as contact with the element is fast. In this case the treatment period is in a range of about 1 second to about 30 minutes. When a gas is used the treatment time might be longer, in particular when the shape of the element is complex, as contacting all parts of an element takes longer. When using a gas the treatment period can be shortened by using agitators like impellers. Moreover, the application of pressure can accelerate treatment. The time period can be shorter when the element has a low surface roughness, such as 5 to 10 μm, and can be higher when surface roughness is high, such as more than 10 μm or even more than 15 μm.

For most polymers that are used to prepare elements by additive manufacturing processes unsubstituted alcohols like ethanol as well as substituted alcohols like HFIP have been found to be useful for smoothening and/or treating. For each treating agent convenient time periods and suitable temperature ranges can be found by routine experiments, examples are provided below.

The method of the present invention can be carried out at any temperature at which the treating agent is in liquid or gaseous form, respectively. Depending on the material to be treated and depending on the treating agent, for example low temperatures in the range of about −5° C. to about 60° C. or high temperatures in the range of about 100° C. to about 175° C., and any temperature in between can be used. In some cases ambient temperature can be used, for example when using HFIP in liquid form. In other cases a temperature in the range of about up to 70° C. can be used, for example when ethanol is used in liquid form. When a treating agent in gaseous form is used, temperatures up to about 175° C. and higher are suitable. The temperature has to be chosen such that the treating agent is gaseous but at the same time the element is not damaged.

It has been found that a treating agent comprising a monovalent unsubstituted alcohol, for example a $C_1$-$C_{10}$-alcohol such as ethanol, can be used in liquid form as treating agent for thermoplastic polymers, such as TPA. When for example ethanol is applied to thermoplastic elements for a period of about 5 seconds to about 40 minutes at a temperature in the range of about 50 to about 120° C., surface roughness can be decreased essentially. By configuring temperature and time period of the application optimal results can be obtained.

Although it was known to use ethanol to remove powder residues from elements obtained by additive manufacturing processes it was surprising that ethanol can be used as smoothening agent for polymers like polyamide. In the case of polyamide elements It has been found that ethanol in gaseous form is suitable, whereas for thermoplastic elastomers liquid ethanol can be applied. For polyamide elements ethanol at a temperature range between about 125° C. and about 175° C., such as 130° C. to 165° C., in particular 135° C. to 160° C. results in a satisfying smoothening effect. In this case a suitable time period is about 5 seconds to about 60 minutes, such as about 1 to about 40 minutes, in particular 5 to 30 minutes. Although when using ethanol a higher temperature for smoothening the element is necessary, the advantage is that it is a very biocompatible solvent.

It has been found that the effect obtained can be regulated not only by the application time and temperature but also by the cooling speed and temperature as outlined below.

An example for a substituted alcohol to be used as or as part of a treating agent is hexafluoroisopropanol (HFIP). HFIP is useful for polyamide elements as well as for elements made from thermoplastic polymers such as thermoplastic elastomers. When treating an element for a time period of about 1 second to about 60 minutes or more and thereafter removing the solvent surface roughness can be decreased by several μms, for example by 3 to 15 μm. HFIP is active as a treatment agent in liquid as well as gaseous form. When used as a liquid, HFIP can be used at a temperature between about −3 and about 58° C. at ambient pressure. A convenient temperature range is between about 0° C. and about 35° C., such as 15 to 30° C. One advantage of using HFIP is that it is active at about room temperature, i.e. about 20 to about 25° C., or slightly above. HFIP has a boiling point of about 58° C. and, therefore, can be vaporized easily.

In one embodiment of the present invention the treating agent comprises or consists of HFIP, which provides for fast smoothening of the surface of the elements. As the treatment is very fast, it can be of interest to decelerate the speed of smoothening. This can be done either by decreasing the temperature of application, such as a temperature in the range of about 0 to about 20° C. On the other hand, this can be achieved by "diluting" the main treatment solvent HFIP by a HFIP compatible solvent. It has been found that a combination of HFIP and acetone allows a longer treatment time as smoothening takes a bit longer. Other HFIP compatible solvents, like other halogen containing solvents, such as dichloromethane (DCM) can be used. Any solvent that is miscible with HFIP and does not have a negative influence on the element can be used. The amount of further solvents can be up to the amount that is compatible with HFIP and allows smoothening. When one or more other solvents are used a ratio of HFIP to other solvents can be in any range, such as a range of 1000:1 to 1:1. An optimal ratio for a specific element can be found by routine experiments.

The application of the treating agent in liquid form can be done in any known manner. For example, an element can be contacted with liquid treating agent by dipping it into the treating agent, by spraying the treating agent on the element etc.

The treating agent can also be applied in gaseous form, i.e. as a vapor.

Application of a treating agent in vaporized form can be achieved in any known manner. For example, the treatment agent can be heated in a container and the element can be contacted with the gaseous treatment agent. Methods for vaporizing solvents are well-known in the art.

It has been found that a device as described below, is particularly useful for applying vaporized solvent on an element.

The contacting time when using vaporized solvent is longer than for the use of a liquid and can be in a range of about 1 min to about 45 min or even longer, such as 5 to 25 min, for example 7 to 20 min. The time period depends on the type and amount of solvent used, the temperature used, the size and shape of the element, the surface roughness, pressure etc. Optimal results can be obtained at room temperature which is very convenient as neither heating nor cooling is necessary. The time period can be shortened by using a temperature above room temperature, such as 25 to 40° C., good results can be achieved for example at a temperature of 30 to 35° C. If a temperature in the range of 30 to 40° C. is used, the time period can be shorter for example in the range of about 1 min to about 5 min.

If the solvent is applied for a longer period, the element softens, contours can become blurred or delicate parts or channels can be destroyed.

Moreover, the time of application also depends on the surface roughness. For example, elements that have been obtained by SLS usually have a higher surface roughness than elements that have been obtained by MJF or HSS. Therefore, the time period for getting smooth surfaces can be higher for SLS elements than for MJF elements.

It has been found that the best results can be obtained when the contact time between element and vaporized solvent is in the range between 3 and 15 min, such as 8 to 12 min, in particular when the treatment is carried out at room temperature or slightly above. The contact time can be shorter at higher temperature and longer at lower temperature. Moreover, the contact time can be adapted by combining the alcohol with another solvent that deactivates or activates the smoothening and softening effect of the alcohol, such as ethanol or HFIP on the element. When the time period is too long, the shape of the element can be adversely affected by rounding of edges and melting of delicate parts. On the other hand, if the time period is too short, the surface will not be smoothened sufficiently.

The treating agent is applied at least once on the element; the application step can be repeated. An application one to five times, such as one, two or three times has been found useful. When an application time is mentioned, it is the time for that very step. In other words, when more than one application step is carried out, the application time of one step is independent from the time used for the other step(s). When the treating agent is applied more than once, the application time for each run is indicated for example, an element can be treated once for 10 minutes, or twice, for example one run for 4 minutes and one run for 5 minutes, or any other combination, time period and number of runs.

The amount of treating agent to be used can be determined by a skilled person. For example for HFIP an amount of about 0.5 to about 5 ml per L volume of the chamber used for treatment, such as 1 to 3 ml HFIP per L volume of the chamber can be used.

The method of the present invention can be carried out in any device known for contacting elements with a liquid or vapor. When solvent vapor is used, a device that provides for vaporisation of a solvent is used, such as a device comprising a chamber, for example a device of the present invention as described in detail below. As an example, the chamber can be a vacuum chamber or a chamber comprising a microwave and/or ultrasound unit and the surface of an element can be smoothened by laying the element into said chamber, preferably such that the area in contact with bottom or wall of the chamber is as small as possible, preferably by using an element contact area with support points, for example needle or ball like parts.

In the case of a vacuum chamber after closing air is withdrawn by a vacuum pump. Air can be removed from the chamber until a pressure as defined or desired, such as a pressure of about 1 Pascal to about 90 kPa or more has been achieved. The exact pressure can be determined by a pressure gauge. When a pressure as desired, for example more than about 1 Pa up to less than about 90 kPa, has been achieved, the vacuum pump can be turned off.

When using HFIP as treating agent, one advantage is that it is not necessary to heat or cool the system, as evacuation as well as treatment with the method of the present invention yields good results in reasonable time at room temperature. If necessary, the system can be heated or cooled. Moreover, it is possible to use high vacuum such as about 1 Pa or less, but in most cases is not necessary, but it is sufficient to apply a vacuum in the range of about 0.01 to 0.9 bar. A pressure of less than 0.01 bar can for example be useful, if a combination of solvents is used, such as HFIP with another solvent that has a higher boiling point. A vacuum in the range of 0.01 to 0.5 bar has been found suitable, in particular 0.02 to 0.3 bar. If a higher temperature, such as 30 to 40° C., or a lower temperature in the range of 3 to 15° C. is used the pressure can be adapted accordingly. i.e can be decreased or increased.

In the case of a chamber comprising a microwave or ultrasound unit after closing the chamber is heated by microwaves or by ultrasonic waves, for example by an external microwave or ultrasound unit.

An amount of treating agent is introduced into the chamber. This is done as known to the skilled person, for example by using a syringe, a valve or a peristaltic pump.

In the case where HFIP is used as treating agent, when using a vacuum chamber, as the boiling point of HFIP is only about 58° C., a vacuum in the range of 0.01 to 0.9 bar, such as 0.02 to 0.5 bar is sufficient to vaporize this solvent. When a different treating agent is used the vacuum can be adapted accordingly.

When using a chamber with microwave and/or ultrasonic unit the conditions can be adapted accordingly.

The treating agent can be transferred into the chamber either actively by pumping it into the chamber or, for a vacuum chamber, passively by opening a valve of the vacuum chamber such that the pressure in the vacuum chamber transports the treating agent into the chamber. After introduction of the treating agent, the syringe can be removed or the peristaltic pump can be turned off, respectively. If a valve has been used, this can be closed.

To improve the distribution of vapor it is useful to use distributor means such as a fan, impeller, jet, nozzle, ultrasonic nebulizer, or any other device for circulation or turbulation of the gaseous treating agent. In one embodiment of the device of the present invention at least one impeller is provided, for example at the bottom of the vacuum chamber. One or more impellers can be used, for example one to five impellers. To circulate gas or to provide for a turbulent stream, more impellers can be useful, for example one impeller at the bottom of the vacuum chamber that generally provides for circulation of gas and further impellers that can be mounted at any place within the vacuum chamber to improve the contact between gaseous treating agent and elements. High flow velocity supports transport of as many solvent molecules as possible. Low pitch impellers are useful for circulating treating agent in the vacuum chamber. Furthermore, it can be useful to provide local heating means to heat solvent for fast evaporation at the entry. High flow velocity or jet streaming helps to avoid adhering of elements to each other.

It has been found that a turbulent flow is particularly useful for complex structures and also for chained, woven or non-woven structures. The turbulent flow provides that the solvent/air mixture comes into contact with all parts of a complex structure and also provides for a short contact only to avoid that parts of the complex structure are melted together or softened.

When treatment of the element by vapor has been finished, solvent is withdrawn, evacuated or extracted from the chamber. In those cases where solvent is recovered by using filter means, it can be favorable for better withdrawal, extraction or evacuation, to open a venting valve to allow introduction of a volume of air in about the same amount as solvent volume is withdrawn. This is not necessary when a recovery trap is used. The amount of gas that is introduced by venting a valve can be adapted by the size of the valve or by active means such as a pump. The time period for evacuation is not critical, it can be in the range of about 5 minutes or less and up to about 60 minutes or more. If the evacuation period is too short, solvent remains in the chamber and on the elements and could soften the surface and delicate parts. If the evacuation period is longer than 60 minutes, no or hardly any further solvent is removed and no advantage is achieved. The element laying in the chamber is in contact with the circulating gas for a period as described above. After the treatment period the chamber is vented, for example by opening a stop valve, by introducing air via a pump and/or by opening the chamber.

When microwaves or ultrasound waves are used for vaporizing the solvent the process is carried out similar as described above by contacting elements with vaporized solvent. In this embodiment the elements are introduced in a chamber, the chamber comprises treating agent, which has been added before introduction of the elements, has been added together with the elements or after introduction of the elements. The material of the chamber preferably is a material that is permeable for microwaves or ultrasonic waves, respectively. The chamber is closed and at least the inner part thereof is irradiated with microwaves or ultrasonic waves of a suitable wave length. The distributor can be inside the chamber and/or outside. A suitable wave length is in a range that vaporizes the treating agent. Thus, the microwaves and/or ultrasonic waves vaporize the treating agent very fast without the need for a vacuum. To improve the contact between elements and vapor distributor means can be used as outlined above.

In some cases by using microwaves and/or ultrasonic waves no vacuum is necessary. The contact step can be carried out at normal pressure, increased or decreased pressure. Under such conditions distributor means can be used with more efficiency. Thus, the pressure can be adapted accordingly. Whether pressure should be applied and if so in which range it has to be applied can be determined and optimized by a skilled artisan.

After treatment the elements can be removed from the treatment chamber and dried. Drying can be achieved by storing, in an oven or dry box, optionally using means like a fan or any other means known to remove remaining treating agent. The drying time is not critical and can be from about 5 minutes up to hours or even days such as 1 to 24 hours.

Another device for treating elements is described in the following. A system for smoothening elements with a treating agent comprising an aliphatic alcohol such as ethanol can be heated in a heated pressure vessel, such as electrically heated pressure vessel. Such pressure vessel can enclose additive manufactured elements and expose them to either the liquid treating agent and/or alcohol vapour that has been formed under the influence of heat. By adapting process time and temperature it is possible to obtain a smoothened surface that is either glossy or matt.

For the application of a solvent like ethanol, a pressure vessel can be used with a lower part that is thermally separated from an upper part as far as possible. The pressure vessel is equipped with a lowerable platform for positioning 3D elements. The elements can be arranged in any possible form, for example elements can be suspended under the platform by suspension means and/or can be laid on a platform, for example can be arranged as bulk material in a perforated or slotted tank or on a grid. Possibilities of the component-specific storage or the different clamping and suspension variants are described below.

In some cases it is useful or necessary to control and/or adapt the smoothening process. This can be done by variation of the temperature during treatment, or by introducing a process-inhibiting component before elements on a platform are removed or moved back on the platform to the upper end position. The liquid will preferably have boiling temperatures above the smoothing process temperature. Such a process inhibiting liquid can be e.g. glycerol with a pre-temperature of about 18° C. to about 200° C., or water in liquid form. It is also possible to introduce first the treating agent for smoothening and after smoothening introduce a second smoothing inhibiting liquid into the container. At the end of the process time, the treating agent is pumped out of the container into a collection container and then the process-inhibiting liquid is fed into the pressure container.

For circulation of the liquid it can be useful to use an agitating device, such as a distributor, impeller, or turbulator. Devices useful for agitating or stirring such as stirring bars, impellers etc., are known. Any device used in a method of the present invention must be chemically resistant to the treating agent used and should withstand temperatures as used, for example of more than 170° C. when gaseous ethanol is used.

Control mechanisms are known to the skilled person and can be electrical, pneumatic, hydraulic or a different type of drive. The platform with the additive components remains in the alcoholic liquid during the set process time.

Some embodiments for treating elements are outlined below. Each step that is described can be combined with other embodiments as long as there is no contradiction and as long as the context allows.

It is also possible to provide two containers with liquids inside a pressure container. These containers are preferably open at the top. One liquid is a treatment agent for smoothening the elements at elevated temperature, such as ethanol. The second liquid is a process-inhibiting agent with higher boiling temperature, i.e. an inert solvent such as glycerol or water. A mechanical manipulator such as a gantry crane transports the elements between the two containers according to the process description.

Another device for smoothening elements with the treating agent of the present invention, such as ethanol or mixtures thereof, is a heatable pressure vessel which, instead of liquid alcohol, uses exclusively or predominantly alcohol vapour for the active smoothening process. For stopping or delaying the smoothening process, one or more additional liquid(s), preferably with a boiling temperature above the process temperature, such as glycerol, can be added to the pressure vessel. This can be done before, during or after the active smoothening process in a manner known to the skilled person. For smoothening, the elements can be stored in a container. Options for element-specific storage or for different clamping and suspension variants are described below. After the elements have been stored in the pressure vessel, it is closed and either air can be sucked off to create a negative pressure or a positive pressure can be achieved by filling with compressed air and/or process gas such as a protective gas.

It can be started from the normally prevailing air pressure in the pressure vessel as the basis for further process steps. In a preferred embodiment, air and/or process gas is actively circulated. This can be done in a manner known to the skilled person. For example, fan wheels can be installed in the process chamber, which are either driven by an internal engine, by a fan wheel driven from the outside via a shaft bushing, or by a magnetic bushing such as a magnetic stirrer modified according to the process and a magnetic fan wheel located in the chamber. When the process relevant pressure is set in the vessel, the pressure chamber, the additive components and the preferably contained process gas can be heated to a temperature of up to about 70° C., preferably to about 100° C. and particularly to at least about 130° C. The pressure chamber, the elements and the process gas, if used, are heated to a temperature of up to about 70° C., preferably up to about 100° C. and particularly at least to about 130° C. In a variant of the method of the present invention, the temperature initially remains approximately at the start temperature and is heated up, if at all, only through the compression of the compressed air and/or the process gas.

After the required temperature has been reached, a treating agent, such as a $C_1$-$C_{10}$-alcohol or a mixture of alcohols, preferably ethanol, is introduced into the pressure vessel at a process-specific temperature of about 20° C. to about 220° C. The liquid or gaseous alcohol may be introduced by injection through one or more nozzles specially distributed over the chamber or by other means known to the skilled person. In an embodiment of the process according to the invention, no liquid or gaseous alcohol is introduced into the pressure chamber, but this is achieved by introducing frozen alcohol or an alcohol as described above can be stored in activated carbon or similar absorbing media, or mixtures thereof. The process is then kept at this level for a certain period of time, usually between 10 seconds and 20 minutes. The temperature can also be slightly increased or decreased as is technically possible and advantageous for the process. After reaching the required process time, the active smoothening is stopped or delayed. This can be done by reducing the process temperature relatively quick and/or by introducing the elements into another medium, preferably inside the pressure chamber. Possibilities for a fast reduction of the temperature are e.g. the introduction of liquid nitrogen or water or by expansion.

To improve application of a treating agent the following storage component can be used:

In a first variant, the components can be placed on a flat platform, preferably with holes or oblong holes. This type of bearing is preferred for elements that have a flat or largely flat surface on one side of the component. Such elements can be e.g. housings or flat or plate shaped elements. Components with a possible three-point or multi-point support can also be suitable for this storage variant. In a further variant for the optimal storage of the elements, special clamping or suspension devices are provided, preferably specifically adapted to the individual element geometry. Such clamping and suspension devices are preferably manufactured from a process-resistant material additive in order to meet the special requirements of this surface smoothing method.

In another variant, non-functional edges and/or surfaces of the additive components are already modified in the design phase so that simple and gentle clamping or suspension of the same is possible. Such a modification should, if possible, be carried out in the form of standardization. Possible mounting and/or suspensions are e.g. bores and/or hooks or eyelets on the inside of housings. By means of a tensioning and/or suspension device according to this description, defined surfaces can be covered at the same time, for example, so that no smoothening occurs in these areas.

Similarly, it is possible to cover corresponding areas with form negatives, which are preferably obtained by additive manufacturing, in order to avoid smoothening in areas that shall not be smoothened because of subsequent colouring and/or functionalising at these areas. Reasons for such areas are e.g. surfaces for subsequent bonding, for which surfaces with a higher roughness are desired. In the case of a pure covering of the elements by form negatives or similar forms, which serve for the directed covering of selective areas, a standardized clamping method can also bring advantages in the handling.

A further possibility of not smoothening, colouring and/or functionalising elements is selective pretreatment with inactive liquids, pastes or solids such as high-temperature waxes.

For bulk solids the following technology can be used:

A special type of smoothening can be used for bulk solids. In other words, components do not need to be specially stored or separated from each other using this method.

This is made possible by the solution of the surface in liquid and/or gaseous media by appropriate concentrations, temperatures, pressures and times, where no final smoothing occurs, but the surface is only dissolved. The final smoothing takes place in a second medium. This medium slows down and stops the process after a certain time. During this subsequent smoothing with typical process times of about 10 seconds up to about 30 minutes, a further smoothing occurs, which can definitely achieve a higher smoothening factor than the actual smoothening in medium 1. The second advantage of this subsequent smoothing is the fact that the parts do not continue to stick during this phase because the solution strength on the element does not increase any more or only for a very short time. In addition, this second medium forms a kind of protective film or separating layer between the elements so that they do not fuse together. This second medium may be a substance other than medium 1 or may consist of the same medium as medium 1, but have different temperatures and/or concentrations or contain one or more additives.

It has been found that the crystallinity of a surface can be specifically changed by adapting process parameters like temperatures together with the speed of withdrawal of the solvent from the process chamber. Thin flaps or compliant mechanisms can be specifically influenced in their stiffness and vice versa in their flexibility, regardless of the often common initial brittleness of the components. This brittleness often occurring in thin segments of elements obtained by laser sintering (SLS), especially in the Z-direction, is particularly relevant. This can be influenced by a lower local processing temperature than with larger continuous surfaces when viewed at the layer level.

During smoothening, the solvent penetrates into the surface of an element for up to several tenths of a millimetre in process-relevant quantities, depending on the parameterization, and can achieve a homogeneously formed component section with a targeted influence on its brittleness or flexibility through appropriate temperatures and times.

In addition to the targeted surface influence of the mechanical or dynamic properties of the elements, such process control can also have an effect on the micro surface or its after-treatment options. Thus, a matt surface with very smooth surface values can be created by appropriate process control. For post-treatment of components such as coating, galvanizing, bonding or other post-treatment steps, a process carried out in this way can bring advantages in terms of adhesion by, among other things, positively changing the surface tension of the component surface for the respective process.

In most cases an element is treated with treating agent such that the whole surface is in contact with treating agent and, thus, is smoothened. If only part of an element shall be smoothened, then only this part should be in contact with treating agent. This can be achieved by excluding that part of the element that shall remain untreated from contact with treating agent or by protecting it from contact with treating agent, for example, by applying a protective layer on that part of the element that shall remain untreated, for example, by applying a layer, like a wax layer or a silicone layer.

Elements that have been treated as described above and have a white surface can be dyed very easily as the surface after treatment is smooth but not dense or compressed. The elements can be dyed as is known in the art with any type of dyes that are used for dyeing such polymers. If a dye is used that is soluble in the treating agent, smoothening and dyeing can be carried out in one step. It is also possible to first dye and thereafter smoothen the surface of an element as well as first smoothen and then apply the dye. If a dye is not soluble in the alcohol used as treating agent, a solubilizer for the dye can be added, such as water or an organic solvent.

Examples are acid dyes, basic dyes, reaction dyes, sulfur dyes, dispersion dyes, metal complex dyes, etc. and mixtures thereof. The elements can be dyed in many color tones, hues, tints, and shades.

Elements obtained by treatment according to the present invention have a smooth surface which hardens and is mechanically strong and can have any color, such as a white or black color or a color tone which can be obtained as desired by dyeing. These elements can be used as they are, they can be stored until they are used, or they can be treated further with a functionalizing solution to improve or change the properties, and/or to make the surface of the element harder, glossier, more brilliant or texturized. It has been found that elements that have been treated with the method of the present invention can be dyed at lower temperatures than elements of the prior art, for example at less than 100° C. and nevertheless a brilliant uniform surface can be obtained. Moreover, it has been found that when dyeing elements of the present invention, less dye is necessary and there is no need for the application of pressure. Without being bound by theory it is assumed that when using mechanical means for smoothening a surface of an element, densification or closing of pores and cells at the surface can occur, whereas the surface of elements that have been smoothened with the method of the present invention is not densified. Therefore, elements that have been smoothened by the method of the present invention take up the dye from a dye solution more easily, no pressure or high temperatures are necessary and the surface takes up the dye even if the dye solution is not supersaturated. This allows to get good and reproducible results even with less concentrated solutions.

Furthermore, smoothening and dyeing of elements can be done independently in any order, which makes the process very versatile. In one embodiment elements are first smoothened and then dyed, in another embodiment elements are first dyed and then smoothened. Dyeing can be done in the same process line as smoothening or elements can be smoothened, stored and dyed when desired or necessary. Thus, dyeing and smoothening can be carried out independent from each other.

Elements, in particular white elements, that have been treated by the method of the present invention have a smooth surface that can be dyed by conventional dyeing processes. These elements can be dyed in many different tones because of their smooth white surface which has not been densified by mechanical treatment.

One advantage obtained with the method of the present invention is that the surface is smooth and does not or hardly comprise powder because any powder that remained after additive manufacturing on the surface is removed or melted or fused by the treatment of the present invention.

Another advantage is the mechanical strength, in particular fatigue strength of the elements. Without being bound by theory it is assumed that by treating elements with the method of the present invention boundary stress is reduced and molecular chains are reordered or restructured with the result of a smoother and stronger surface.

Although the method of the present invention is particularly useful for elements produced from thermoplastic polymers, the method can also be used for photopolymerizable duroplastic polymers produced by 3D printing, where in a first step elements are produced by printing and after the printing step are post-cured by using UV and/or heating. It is possible to smoothen the surface of this type of elements by applying the treating agent after printing and before post-curing.

In summary, the present invention provides a method which can be carried out at convenient temperature, for some treating agent and polymers, respectively, at room temperature or slightly above or below room temperature, in a relatively short time and yields elements of very high quality with a smooth surface and without damage to delicate parts. The use of milling, grinding, or polishing steps or other mechanical treatment steps is avoided and nevertheless a high quality finishing is obtained.

The method of the present invention allows not only smoothening but also functionalizing elements to improve their properties such as gloss, texture, mechanical strength, electrical properties, such as electrostatic charge etc. This is achieved by contacting elements with a functionalizing agent together with treating agent or directly after treatment as long as the surface of the element is still soft.

A functionalizing solution or functionalizing agent can be applied to the element either together with the treating agent or to the element obtained after application of treating agent. A functionalizing agent is any agent that provides the surface with positive properties, such as appearance, color, and/or texture. A functionalizing agent can provide for a hard and/or glossy surface, a deep black surface or a surface in a desired color tone, a specific texture of the surface, a metalized surface that optionally can be galvanized afterwards, i.e. a priming layer for galvanization, or a surface that avoids electrostatic charging. The functionalizing agent can also comprise fibers or other reinforcing agents, which can either result in a reinforced layer and/or in a texturized layer. It is also possible to use a plasticizer as functionalizing agent to provide for a smooth and soft surface. These functionalizing agents can be used as known to the skilled person, i.e. in concentrations, at temperatures and in time periods that are usually used for such agents. The method of the present invention allows to use such functionalizing agents and to provide functionalized surfaces in an easy way. Thus, the method of the present invention is very versatile and allows the creation of different surfaces as it is desired.

For application the functionalizing agent can either be dissolved in the treating agent comprising at least an alcohol and optionally additional solvent or it can be dissolved in another solvent and can be applied together with the treating agent. It is also possible to apply a solution of the functionalizing agent shortly after the smoothening step, for example within 1 to 20 minutes after the smoothening step. It is also possible to apply a functionalizing agent in powder form either dispersed in the treating agent or as separate dispersion together with the treating agent or after application of the treating agent as long as the surface of the element is still soft or adhesive. For example a dispersion of treating agent and powdered functionalizing agent can be used.

It has been found that when using a, such as a metal powder, it is one option to use a vaporization chamber with a microwave and/or ultrasound unit for the contacting step with solvent vapor. In particular metal powder with particles in the nanometer range can be distributed in high density and with high uniformity by microwaves and/or ultrasonic waves. Microwaves and/or ultrasonic waves provide that the vapor created smoothens the surface and distributes the functionalizing agent very uniformly. Another options is to apply functionalizing agent together with or after treatment with treatment agent in liquid/fluid/dispersed form. For example the functionalizing agent can be provided in liquid form in a container and elements can be dipped into it.

As the method of the present invention results in elements with a smoothened surface without densifying the surface layer, these elements can be dyed with good results with acid dyes, dispersion dyes, sulfur dyes or other dyes known for dyeing polymers used for additive manufacturing processes, such as polyamide. Thus, a dyed and smooth surface with high quality is obtained. Examples for dyes that are useful for dyeing polyamide are C.I. Acid Red dyes, C.I. Acid Blue dyes, C.I. Acid Yellow dyes, C.I. Acid Black dyes, C.I. Acid Orange dyes, or mixtures thereof, such as CI Acid Red 1, CI Acid Red 138, CI Acid Red 52, CI Acid Blue 40, Nylason red N-2RBL, or mixtures thereof. The acid dyes can for example be used in a concentration of about 0.1 to about 7.5 wt.-%.

As the elements obtained by the treatment of the present invention have a smooth surface without densification by mechanical means, the temperature for dyeing can be lower than for elements obtained with prior art processes. For example, it has been found that dyeing can be done at temperature of about 40 to 130° C. The time for dyeing can be in a range of about 10 to about 180 minutes.

Generally, after finalizing the treatment steps the element is taken out of the device and dried. Any remaining liquid should be removed and the element can be dried as is known to the skilled person, for example by just leaving the element in open air, or by heating, using an air stream or jet stream or any other means that is usually used for drying elements or components.

The method of the present invention smoothens the surface of elements that have been obtained by an additive manufacturing process using building material in powder form, where the elements have a roughness $R_a$ of the surface of the elements before treatment in the range of up to 20 μm, such as 3 to 12 μm. By treatment in accordance of the present invention the elements can be smoothened to reduce the roughness by up to about 15 μm, such as about 5 to about 10 μm, such that the roughness after treatment for example is in the range up of about 10 μm, such as about 0.3 to about 5 μm, for example 1 to 3 μm. Further reduction of roughness can be obtained by using more than one treatment run. The smoothening effect can be obtained without mechanical pre-treatment. Furthermore, the method of the present invention has further advantages as the steps can be carried out easily and can be automatized.

In a further embodiment of the present invention a mechanical step can be carried out after treatment of elements with the treating agent as long as the surface of the elements is still soft. In same cases treatment with glass balls or jet stream and/or open air plasm can further smoothen the surface.

The method of the present invention can optionally comprise a further step—a post-processing step wherein elements that have been subjected to treatment with a treating agent, wherein the post-processing step comprises that the elements are contacted with a post-processing composition, which can be water or an aqueous solution, immediately or up to 5 minutes after treatment. The contact with water or an aqueous solution provides for a fast solidification of the surface and, thus, avoids sticking together of elements and damage of the surface. The composition of the aqueous solution is not critical as long as it does not have a detrimental effect on the elements or the elements' surface, respectively. Suitable as aqueous solution is for example a mixture of water and a polyvalent alcohol, such as a mixture of about 1 Vol.-% to about 25 Vol.-% of a polyvalent alcohol and water. A suitable polyvalent alcohol is for example diethylene glycol, water can be distilled water. The temperature of the post-processing composition is not critical. Ambient temperature is suitable and most convenient. A temperature below ambient temperature can be useful. It has been found that the result can be improved by using water or an aqueous solution with a temperature in the range of about 0° C. to about 15° C.

Post-processing of elements obtained after the smoothening step by drying in an oven or by using vacuum for drying can further improve the result.

The method of the present invention can be carried out in devices that have been developed for treatment of elements with treating agent as vapor and/or liquid. A device that is particularly suited for treating elements is also a subject of the present invention.

Figure 1:
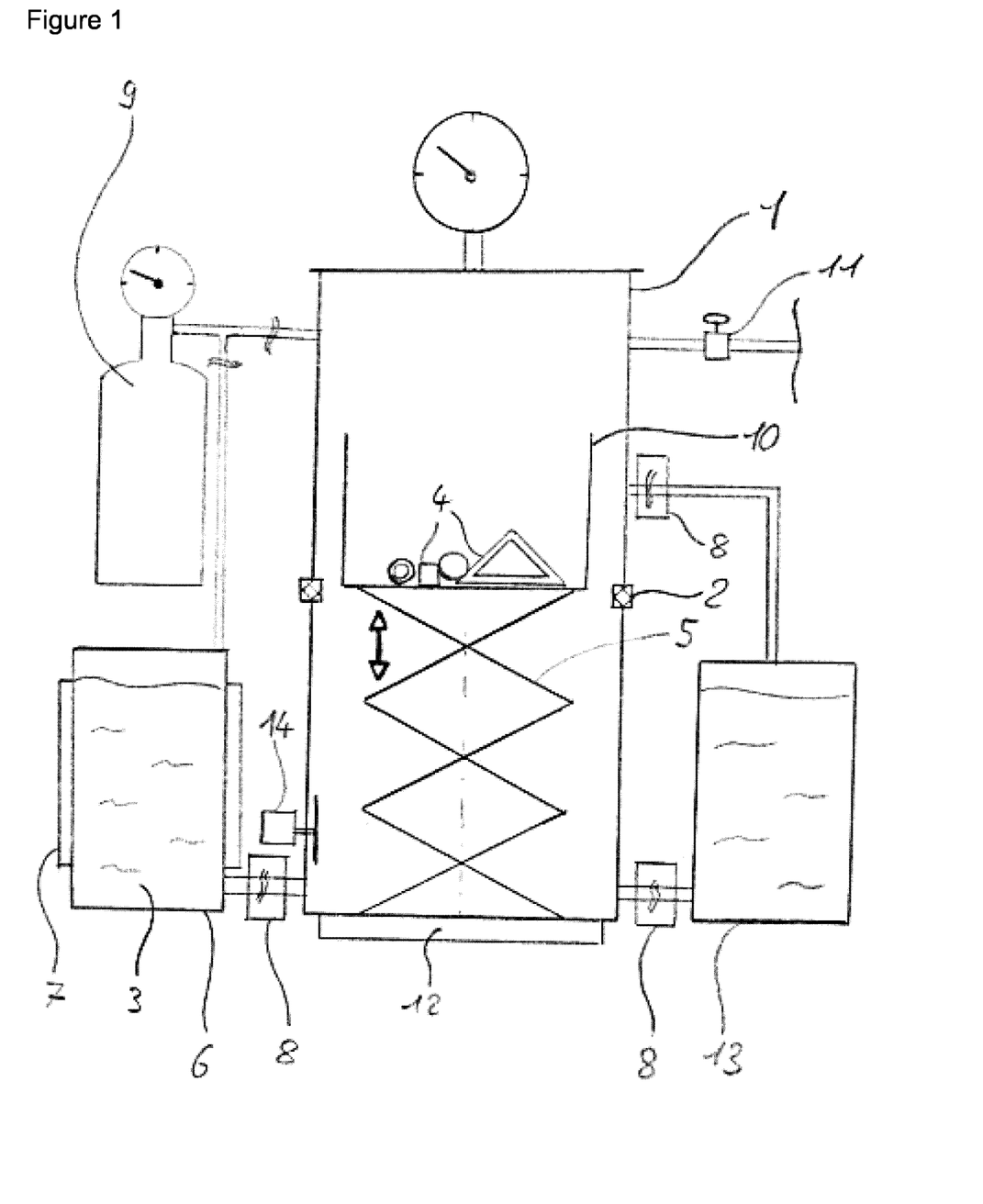
FIG. 1 shows a device that can be used for different embodiments comprising a process chamber or application unit for contacting elements with a treatment agent.
Figure 2:
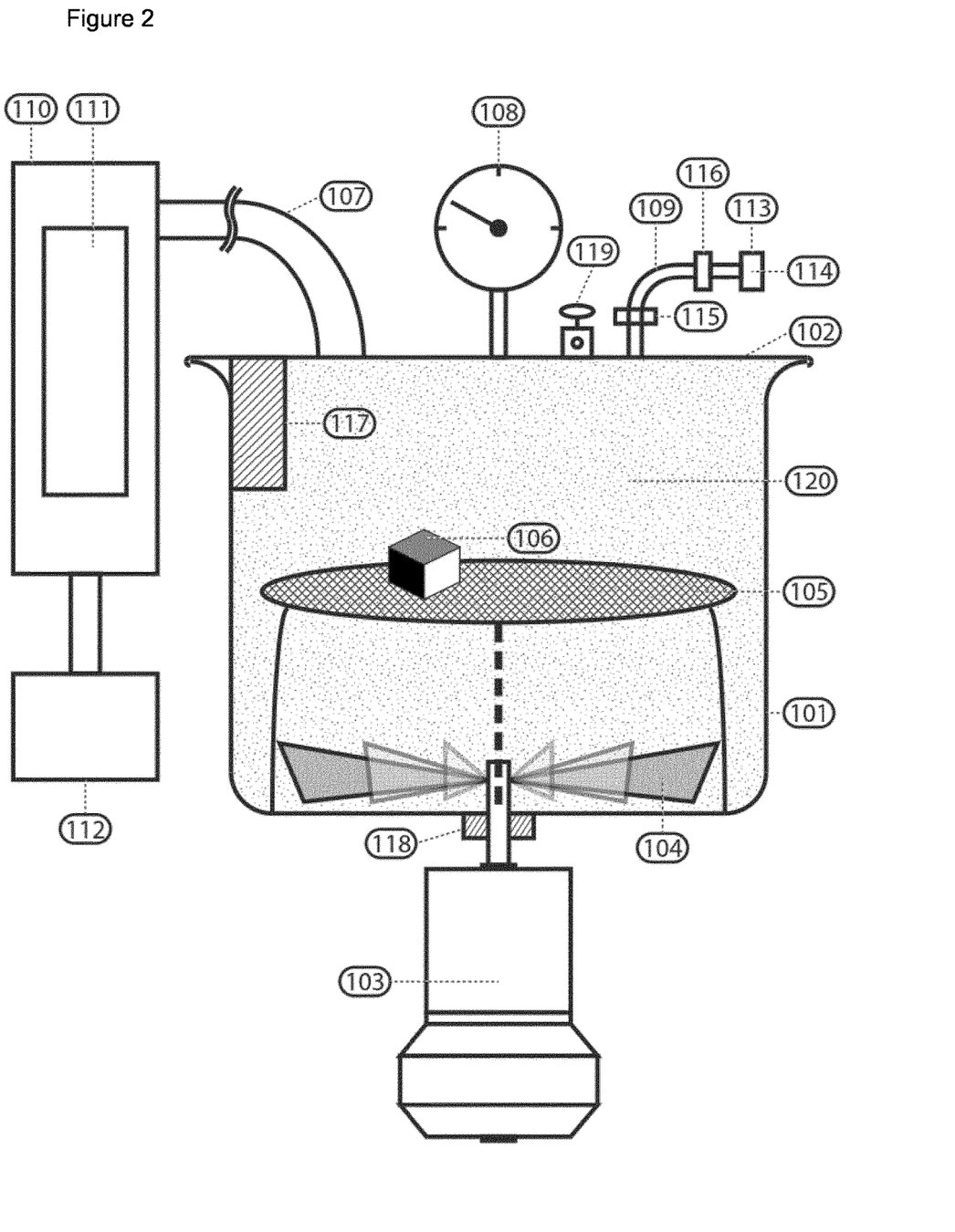

FIGS. 1 and 2 show devices that can be used. FIG. 1 shows a device that can be used for different embodiments. The following reference numbers are used:
- 1 Process chamber
- 2 Thermal barrier
- 3 Treating agent (liquid or gas)
- 4 Elements
- Platform
- 6 Container
- 7 Heating means
- 8 Feed pump(s)
- 9 Process gas
- Body
- 11 Venting valve
- 12 Heating means
- 13 Container
- 14 Stirrer As can be seen the device comprises a process chamber or application unit (1) for contacting elements (4) with a treatment agent (3). In a preferred embodiment the lower part of process chamber (1) is thermally separated from the upper part of the process chamber (1), for example by one or more thermal barriers (2). The position of the thermal barrier (2) is not critical as long as thermal separation occurs. Thus, the one or more thermal barriers (2) can be arranged at different positions. Elements (4) in a first design can be placed, laid, suspended, or clamped on or at a lowerable platform (5), for example at the upper end of the platform. When elements (4) shall be treated as bulk material, they can be accommodated by accommodating means (10). A treatment agent (3) is preferably stored in a separate container (6) and can be heated to the process temperature by heating elements (7). The treating agent can be heated to the treatment temperature before introduction into the process chamber and/or can be heated within the chamber. For example, the treating agent (3) can be heated outside chamber (1) and can be introduced as soon as it has reached the process temperature. Introduction of treatment agent (3) can be done as known in the art, for example by means of a feed pump (8) and/or by applying a suitable process gas (9) by gas pressure and/or by other methods known to the skilled person.

In order to achieve a uniform pressure distribution, or a pressure distribution adapted to the process, between vessel (6) and process chamber (1), pressure within the process chamber (1) can be adjusted accordingly before, during or after the introduction of the treatment agent (3) into the process chamber (1), for example by feeding process gas (9) into the process chamber (1). The skilled person can identify optimal conditions by routine experiments.

Alternatively, compressed air can be used as process gas (9). In those cases where elements (4) shall be dipped into the treatment agent (3) sufficient treatment agent (3) will be provided in process chamber (1), so that when lowering platform (5) with the elements (4), they are in contact with the treating agent (3). After a suitable time period, platform (5) is returned to its upper end position, and the elements are removed from contact with the treating agent. This slows down or stops the smoothening process.

To control the smoothening process it is possible to feed process gas (9), such as nitrogen, and/or additional treating agent and/or an additional solvent from container (13) to process chamber (1). Feeding of gas and/or of additional treating agent and/or of an additional solvent can be done simultaneously or after lifting off the platform (5) in order to control the process and to decelerate and/or stop the smoothening process.

Treatment agent (3) can be recovered, for example by pumping it back into container (6) after treatment. The treatment agent can be fed back into the storage container and can be stored or can be kept at process temperature and recycled for a next smoothening step, or treatment agent can be processed and for a next smoothening process.

To save energy it is convenient to recycle treatment agent (3) to tank (6) or another container (not shown) and maintain the temperature at or close to the process temperature.

Process chamber (1) can be equipped with additional heating means (12) which can be provided internally or externally. In addition, process chamber (1) can be provided with agitating means for agitating or circulating liquid and/or gas in the chamber. Many suitable agitating means (14) like stirrer, impeller, turbulator, jet etc. are known to the skilled person. This allows achieving as uniform a smoothening and/or colouring and/or functionalising process of elements (4) as possible.

In another embodiment the device shown in FIG. 1 has a central body (10) for receiving, supporting, or holding elements (4), In this embodiment neither a movable platform (5) nor a thermal barrier (2) is necessary. Elements (4) can either be introduced directly into the process chamber (1) as bulk material and/or can be suspended using suspension means. In this embodiment elements can be distributed within and over the entire height/space of process chamber (1). Once elements (4) have been introduced into the process chamber, the chamber and the elements, respectively can be heated by one or more heating elements (12) as required. It is also possible to use heated gas, such as a heated gas stream. The heating element (12) can be any type of heating means as known to the skilled person and can be used as is known to the skilled person.

When the treatment is carried out at elevated temperature, heating can be obtained either by heating means that are present internally or externally, by introducing heated gas and/or by preheating elements. Once elements (4) have been introduced into the process chamber, the chamber (19 can be heated as required with the heating element (12). The temperature in the chamber can be controlled as is known to the skilled person. When the process chamber (1) and/or elements (4) have the predetermined temperature, process gas (9) may be introduced at a pressure as required. This can also be done during or before the heating of the process chamber (1) and the elements (4). In a next step, treatment agent (3) can be introduced into the process chamber (1). After the smoothening step has been finished, treatment agent (3) can be pumped back into container (6) or another container (not shown). Alternatively, a process-inhibiting liquid and/or a process-inhibiting gas at a predetermined temperature can also be fed from the container (13) or from one or more further containers (not shown) into the process chamber (1) while the treatment agent (3) is still present. A mixture of treatment agent (3) and process-inhibiting liquid and/or process-inhibiting gas can be formed and this mixture can be fed back into container (6) and/or one or more further containers (not shown) after a predetermined time. Elements (4) can then be removed either immediately or after a cooling time.

In a third embodiment of a device according to FIG. 1, elements (4) are smoothened with a treating agent (3) in gas form instead of a liquid. For this embodiment no thermal barrier (2) is necessary. The difference between this embodiment and the second embodiment is that either treatment agent gas (3) is introduced into the process chamber (1) and/or treatment agent gas (3) is formed at least partially within the process chamber (1). The smoothening process does not differ essentially from the process as carried out and described for a device shown in FIG. 2. The main difference is with regard to the pressure used within chamber (1), which can be above atmospheric pressure. With this embodiment, the gaseous treating agent (3) can preferably be circulated during the process by suitable means such as propellers or impellers (not shown, see FIG. 2). Furthermore, this variant offers the possibility of introducing a process-inhibiting liquid and/or a process-inhibiting gas during and/or after the smoothening step, whereby the smoothening process can be controlled, for example decelerated and/or stopped and/or a functionalizing process can be included, such as generating textures on the component surface. Alternatively, instead of a process-inhibiting liquid, another liquid that positively influences the smoothening process, a corresponding gas or corresponding solids such as powder or fibres can be introduced into the process chamber (1). In all three embodiments, when using a device as shown in FIG. 1, it is possible with a suitable discharge valve (11) and optionally solvent storage and recovery means, for example, activated carbon filter, residual pressure and any residues of the treating agent (3) can be safely discharged from process chamber (1).

In particular for treating elements that are used in the medical field it is useful to remove s much treating agent (3) and/or additional solvent, if present, as possible. This can be done with a vacuum pump and recovery means (not shown), like filter means or recovery trap, as shown below for the device of FIG. 2. Any treating agent (3) remaining in the process chamber (1) after the pressure has been released can be safely removed and optionally can be recovered.

All embodiments described above with regard to a device as shown in FIG. 1 can be combined with an additional dyeing and/or functionalisation step by introducing suitable substances into the process chamber (1) either during the smoothening step and/or thereafter, for example in a time window after smoothening as described before.

FIG. 2 shows another device that is also useful for treating elements according to the present invention. The device as shown in FIG. 2 comprises a chamber (101) for contacting elements with vapor, at least one element contact area (105), a dosing unit for solvent, which is the treating agent, comprising a solvent feed line for feeding treating agent into chamber (101) from a treating agent container (113), and a dosing means, and optionally comprises at least one distributor, a withdrawal unit comprising a pump (112), and/or a recovery unit comprising at least one filter unit or a trap. One embodiment of the device of the present invention is shown in FIG. 2 and comprises a vacuum unit as chamber (101). This device uses vacuum for vaporizing the treating agent to be applied to elements and comprises a vacuum unit 101 as shown in FIG. 2 with 101 vacuum unit
102 vacuum lid
103 engine Motor
104 fan propeller
105 element contact area
106 element
107 vacuum tube
108 pressure gauge
109 solvent feed line
110 activated carbon filter
111 activated carbon
112 vacuum pump
113 treating agent container
114 treating agent
115 stop valve
116 feed pump
117 flow element
118 vacuum rotary transmission
119 venting valve
120 treating agent In the following explanation of the device the term "solvent" is used for any type of treating agent and "solvent mixture" comprises mixtures of treating agent and additional solvent as well as mixtures of treating agent and other liquids. Another embodiment of a device of the present invention is a microwave or ultrasound device, wherein vaporization of the solvent or solvent mixture is obtained by using microwaves and/or ultrasonic waves. In this case, microwaves or ultrasonic waves are applied to the chamber by a microwave unit or an ultrasound unit, respectively. The microwave or ultrasound unit can be applied internally or externally. It is preferred that microwaves and/or ultrasonic waves are applied from outside to the chamber. The amount and wave length of the microwaves and/or ultrasonic waves can be adapted as is known to the skilled person such that solvent in the chamber is vaporized. Vaporization with microwaves and/or ultrasonic waves can be carried out at any convenient temperature, such as ambient temperature, and at any convenient pressure, such as ambient pressure, as long as the solvent is vaporized. It is also possible to use negative or positive pressure.

After treatment of elements the solvent is withdrawn from the chamber and can be passed to a recovery unit which comprises at least one filter unit and/or a recovery trap. By passing the solvent through the recovery unit, solvent is adsorbed by the at least one filter unit and/or is condensed in a recovery trap. The recovered solvent can then be used again for the method of the present invention. Therefore, the use of a recovery unit contributes to an efficient and environmentally friendly process.

It has been found that activated carbon is useful as filter means as it is abundantly available and is active in absorbing the solvent or solvent mixture used for the process of the present invention efficiently and also efficiently desorbs the solvent.

The number of cycles or runs for the filter unit before exchange and the number of units used in a specific process can be determined easily by a person skilled in the art.

The solvent can be regenerated by desorption from the filter unit. For desorption, the filter unit, for example an activated carbon unit, can be heated to desorb the solvent. In another embodiment, an air stream having a temperature beyond the boiling temperature of the solvent is passed through the filter unit. Thereafter, the air stream enriched with desorbed solvent is passed to a unit for recovery of the solvent by condensation.

It is also possible to heat the air used for desorption and/or the filtration unit by microwaves and/or ultrasonic waves, either alone or in addition to heating the air stream. For condensation, any trap that is known from distillation processes can be used. In one embodiment, a cold trap, such as a metal tube or a glass vessel can be used. The metal tube can be a tube made from any metal that is inert with regard to the solvent, such as copper or aluminum or any other metal or alloy. The tube can be straight, bent, curved, crooked, or can be in the form of a spiral. Moreover, the tube can be cooled by a heat exchange unit and/or a fluid bath or any other known means. By cooling the solvent, the solvent such as HFIP or a solvent mixture can be condensed and drops into a collecting vessel, such as a collecting jar or a collecting bottle. HFIP has a relatively high density (1.6 kg/L) which provides for fast running down of the condensed solvent. The air, separated from solvent vapor, such as HFIP vapor, having a high temperature, can be passed again into the filtration unit to start a new desorption/condensing cycle.

The device of the present invention can be used to treat elements with solvent vapor. The solvent to be vaporized can be a treating agent or a mixture of treating agent and solvents, such as one or more alcohols, for example one or more halogen containing alcohols like HFIP, organic solvents like acetone or other solvents that preferably have a boiling point in the range of about 40° C. to about 100° C., or mixtures of these solvents. One example for a treating agent is HFIP or a mixture comprising HFIP. In the following description of the device HFIP is mentioned, but any other treating agent could be used instead as long as the boiling point is in a suitable range.

The element to be treated can be any element that should be treated with a vapor or a solvent in gaseous form, respectively. An example for an element to be treated is an element obtained by an additive manufacturing process, in particular an element as described above.

The device comprises a chamber for treating an element with a solvent in gaseous form, wherein a solvent is vaporized and is in contact with at least one element and wherein the solvent is recovered by a recovery means, such as a filter unit or a cold trap. For example, after treatment solvent is withdrawn from the chamber and solvent is recovered by passing it through a filter unit with at least one filter element. The filter element can be made of any material that is used for solvent recovery such as activated carbon. The filter material can be in the form of a membrane, a powder, particles, granules or any other form known to the skilled person. It is also possible to recover solvent by using known solvent recovery means such as cold traps.

FIG. 2 shows an embodiment of the device for treatment of elements of the present invention. The vacuum device comprises a vacuum unit 101 with a lid 102 for closing the vacuum unit. Elements 106 to be treated are positioned on element contact area 105. Treating agent 114 to be used for treatment of the surface of elements 6 is introduced into the vacuum unit 101 from solvent container 113 via solvent feed line 109. Treating agent 114 is introduced into the vacuum unit 101 by a feed pump 116 and introduction is controlled via stop valve 115. To improve contact between gaseous solvent and element at least one fan propeller 104 can be provided which is driven by an engine 103 connected to the fan propeller 104 via a vacuum-tight rotary transmission 118. To vaporize treating agent 114, vacuum unit 101 is evaporated by a vacuum pump 112 via vacuum tube 107. After evaporation the vacuum unit 101 comprises a solvent 120. The pressure inside the vacuum unit is monitored by a pressure gauge 108. Element(s) 106 are in contact with the solvent vapor for a predetermined time period. Thereafter, pressure is released via venting valve 119 and solvent is removed via vacuum tube 107. The solvent 120 is withdrawn from the vacuum unit 101 by vacuum pump 112 and is passed through at least one filter 110 comprising activated carbon 111. By passing through the filter the solvent is absorbed by activated carbon and can be recovered and reused.

The method of the present invention provides for elements with smooth surface that can be used for many purposes. The elements obtained with the method of the present invention are particularly useful for in the medicinal and food industry. For medicinal devices as well as for devices that are used in food technology, smooth surfaces are important not only for esthetical reasons but also for hygienic reasons. Furthermore, the treatment is carried out with a solvent that does not change the elements chemically so that no toxic side products are created. Moreover, elements obtained by additive manufacturing using powder as building material or that have been treated by mechanical grinding or milling have powder on the surface that could be contaminating, i.e. could be taken up by the body when it is on a medicinal product that is inserted in the body or could be taken up by food that is in contact with such an element. This is avoided when using the treatment of the present invention where any powder remaining on the surface after the manufacturing process is "melted in" by treatment with the solvent. Thus, the elements obtained by the method of the present invention are particularly useful for medicinal and food processing devices. Moreover, the elements obtained with the method of the present invention are also useful in the field of aeronautics and astronautics, as powder and solvent residues are undesirable and can be detrimental.

The invention is further explained by the following examples which are not deemed to be restrictive.

Example 1

A vacuum device as shown in FIG. 2 was used to treat polyamide elements: (having a grey color) obtained by an MJF process. The elements had a surface roughness of $R_a=9$; $R_z=50$. Elements 106 were laid on an element contact area 105 of vacuum unit 101 and the unit was closed with vacuum lid 102. Engine 103 driving fan propeller 104 was switched on to provide for circulation of air. Then vacuum pump 112 was switched on and air was withdrawn until pressure gauge 108 showed a pressure of 0.1 bar (absolute). Then vacuum pump 112 was switched off. 5 ml of HFIP as treating agent 114 were injected into vacuum chamber 101 via solvent feed line 109. The solvent vaporized and the HFIP vapor was circulated in the vacuum chamber for 10 minutes. The vacuum unit was neither cooled nor heated. After 10 minutes circulation vacuum pump 112 was switched on again and venting valve 119 was opened, whereby solvent was withdrawn from the vacuum chamber and fed into filter element 110. Venting valve 119 was adapted such that about the same volume of air was introduced as volume of solvent was withdrawn. In other words, the pressure remained in about the same range during this step. The withdrawing step was carried out for about 30 minutes. After 30 minutes vacuum pump 112 was switched off. Engine 103 and thereby also fan propeller 104 was also switched off. Then vacuum lid 102 was opened and elements 106 were removed and dried for 4 hours in a convection oven at 70° C.

The elements obtained were black and smooth and had clear contours. The edges were sharp, not rounded, the surface area was smooth without grooves and elevations, and mechanically strong. The roughness could be reduced significantly:

Roughness of the element after treatment: $R_a=1.1$; $R_z=7$

Example 2

A vacuum device as shown in FIG. 2 was used to treat polyamide elements obtained by an SLS process. The elements had a surface roughness of $R_a=12$; $R_z=64$. Elements 106 were laid on an element contact area 105 of vacuum unit 101 and the unit was closed with vacuum lid 102. Engine 103 driving fan propeller 104 was switched on to provide for circulation of air. Then vacuum pump 112 was switched on and air was withdrawn until pressure gauge 108 showed a pressure of 0.1 bar (absolute). Then vacuum pump 112 was switched off. 5 ml of HFIP as treating agent 114 were injected into vacuum chamber 101 via solvent feed line 109. HFIP was vaporized and the HFIP vapor was circulated in the vacuum chamber for 15 minutes. The vacuum unit was neither cooled nor heated. After 15 minutes circulation vacuum pump 112 was switched on again and venting valve 119 was opened, whereby solvent was withdrawn from the vacuum chamber and fed into filter element 110. Venting valve 119 was adapted such that about the same volume of air was introduced as volume of solvent was withdrawn. In other words, the pressure remained in about the same range during this step. The withdrawing step was carried out for about 45 minutes. After 45 minutes vacuum pump 112 was switched off. Engine 103 and thereby also fan propeller 104 was also switched off. Then vacuum lid 102 was opened and elements 106 were removed and were dried for 12 hours under an exhaust hood and thereafter were dried in a convection oven at 70° C. for 4 hours. The elements obtained after this treatment had clear contours, minimal rounding of edges, no grooves or elevations. The surface was smooth.

Roughness after treatment: $R_a=1.7$; $R_z=10$

Example 3

3D elements are treated with aliphatic alcohol. For this process 3D elements are placed on an element contact area in the form of a platform that can be lowered. A pressure vessel is filled to about half of it with ethanol. The same process is carried out with other alcohols containing 3-6 carbon atoms and with a mixture of one of these alcohols with at least one other solvent. The elements are first deposited on a tray or platform without contact to the treating agent. The vessel is pressurized with compressed air or another process gas, such as a protective gas, up to a pressure of about 20 bar. The liquid treating agent optionally with process gas is heated to a temperature of about 135° C. The heating can be carried out in any manner known to the skilled person in a vessel suitable for heating of alcohols, for example a heating chamber with a double wall. Once the required process temperature has been reached, the lowerable platform with elements is lowered into the alcoholic liquid for about 5 minutes. During this time the surface of the elements is softened and begins to smoothen. After 5 minutes the platform with the elements is lifted up, thereby the elements are contacted with cooler air. By cooling the smoothening process is stopped and the surface becomes strong and smooth. After post-processing elements are removed.

Once the desired surface quality is achieved, the temperature is lowered to about 50° C. before the elements can be removed.

The process is carried out again as described above, however, the pressure in the vessel is decreased by evacuating the vessel, the pressure is lowered to about 1 mbar. In this embodiment the treating agent is introduced into the process vessel only after a vacuum is reached, e.g. by opening a valve. The further process steps is carried out as described above, wherein, however, the platform is not lowered.

In an alternative process, the smoothening process can be stopped slower so that the surface of the elements is in a transition phase where the surface is still soft. This is useful if a functionalizing step is carried out following the smoothening step or when a second smoothening step follows. This improves finishing of the surface while maintaining the exact geometric contours. Another way to stop the smoothening process is to introduce liquid nitrogen into the pressure vessel. This can be advantageous when the inlet pressure is kept as low as possible by introducing compressed air and/or process gas, preferably if the pressure vessel is evacuated before the smoothening phase is initiated.

Example 4

In this example elements prepared from thermoplastic polyetheramide (e.g. available as PEBA 2301 from EOS GmbH Electro Optical Systems, Germany) (TPA or TPE-A) were treated.

Treating agent: Monovalent alcohol in liquid form, preferably ethanol, at a temperature of about 50° C. to about 120° C., preferably at a temperature of about 60° C. to about 78° C., ambient pressure.

The elements were immersed individually or as bulk material in ethanol having a temperature of about 60 to about 70° C. for a time of about 15 seconds to about 5 minutes.

In a second step, the elements were dried either in the air for about 12 hours or in an oven at a temperature of about 70° C. for a period of about 30 minutes. It is also possible to use vacuum drying. The elements were stored separately, to avoid damage of the surface while it was still soft.

Alternatively, the elements can be contacted with water or an aqueous solution immediately or at most up to 5 minutes after treatment and removal. The contact with water or an aqueous solution provides for a fast solidification of the surface and, thus, avoids sticking together of elements and damage of the surface. Suitable as aqueous solution is for example a mixture of about 1 Vol.-% to about 25 Vol.-% of diethylene glycol in distilled water. It has been found that the result can be improved by using water or an aqueous solution of a temperature in the range of about 0° C. to about 8° C.

Post-processing of elements obtained after the smoothening step by drying in an oven or by using vacuum for drying can further improve the result.

Example 5

Elements prepared from TPU (TPE-U), for example TPU as commercially available from Rowak AG, Zurich, Switzerland under the tradename Rolaserit® were dyed by using the process of example 4 The treating agent in this example comprised ethanol, for smoothening, a dye and diethylphthalate (DEP) as plasticizer. Elements were obtained that had a smooth coloured surface.

In a further approach elements obtained with the process of example 4 were functionalized, i.e. the surface was treated with a treating agent comprising ethanol, DEP, and metal powder. For the smoothening step metal powder was dispersed in ethanol comprising DEP and heated. During the smoothening step the composition was agitated to prepare a treating composition with metal powder homogeneously distributed in ethanol. The elements were added to the warm treating composition. When the surface of the components was softened by the warm ethanol, metal powder adhered to the surface of the elements and remained permanently on the surface of the elements after removing the elements from the treatment composition and drying. The same method can be applied for providing a coating of nanotubes or graphene.

Example 6

Elements prepared from TPU, commercially available under the tradename ESTANE® from Lubrizol, Cleveland, Ohio, US, were treated with treating agents comprising ethanol and DMSO, as mixtures with 75% DMSO, 66% DMSO, 50% DMSO, and 33% DMSO.

The elements were dipped, sprayed or brushed with the treating agent. The elements then were dried at room temperature for up to about 24 hours, or at increased temperature of 78° C., such as up to about 60° C. or in an oven for about 10 to about 60 minutes. The elements after treatment had a smooth surface, where elements before (a) and after treatment (b) are shown.

This method can also be used for colouring and/or functionalising the surface by adding a colorant or functionalizing agent to DMSO or a DMSO/ethanol mixture and using this composition of treatment.

The invention claimed is:

1. A method for treatment of polymer elements obtained by a powder-based additive manufacturing process, the method comprising:
applying on the element vapor of a treating agent comprising at least one monovalent or polyvalent alcohol while the treating agent is being applied under a pressure of about 0.01 to about 0.9 bar, and thereafter removing the treating agent and optionally recovering at least part of the treating agent, wherein applying on the element the vapor of the treating agent comprises circulating a turbulent flow of the vapor of the treating agent by an impeller or a propeller.

2. The method according to claim 1, wherein the treating agent comprises at least one substituted or unsubstituted aliphatic $C_1$-$C_{10}$ alcohol or substituted or unsubstituted aromatic $C_6$-$C_{12}$ alcohol or a mixture thereof.

3. The method of claim 1, wherein the alcohol is ethanol, propanol, isopropanol, butanol, glycol, glycerol, benzyl alcohol, chloro benzene, triethylene glycol, 2,2,2-trifluoroethanol, hexafluoroisopropanol or a mixture thereof.

4. The method of claim 1, wherein the treating agent comprises at least one additional solvent and/or at least one plasticizer.

5. The method of claim 4, wherein the additional solvent is esters, ethers, ketones, lactones, or DMSO, and/or wherein the plasticizer is aromatic esters, aliphatic esters, cycloaliphatic esters, or bio-based compounds, wherein optionally the solvent is DMSO or γ-butyrolactone, and/or wherein optionally the plasticizer is at least one of phthalates, benzoates, citrates, adipates, sebacates, cyclohexane dicarboxylic acid alkyl esters, fatty oils, or essential oils.

6. The method of claim 1, wherein the treating agent is applied for a period of about 1 second to about 60 minutes.

7. The method of claim 1, wherein the treating agent comprises hexafluoroisopropanol (HFIP).

8. The method of claim 1, wherein the treating agent comprises at least ethanol and is applied at a temperature in the range of about 100° C. to about 175° C. for a period of about 5 seconds to about 60 minutes.

9. The method of claim 1, wherein the treating agent is removed by extracting the vapor and/or drying the elements in an oven for a period of about 5 minutes to about 48 hours.

10. The method of claim 1, wherein the treating agent is removed by contacting treated elements with an aqueous composition and thereafter by drying the elements.

11. The method of claim 1 further additionally comprising a functionalizing step, which comprises applying at least one functionalizing agent on the element during or after treatment with the treating agent.

12. The method of claim 1 wherein in addition to the application step at least one further application step and/or at least one functionalizing step, which comprises applying at least one functionalizing agent on the element during or after treatment with the treating agent, are carried out.

13. The method of claim 1 wherein during at least one of the application steps and/or functionalizing steps distribution means are used, wherein the distribution means optionally is a microwave, a fan propeller, and/or an ultrasound unit.

14. The method of claim 1 wherein a post-processing step is carried out after application of the treating agent and optionally a functionalizing step, wherein the post-processing step comprises treating the elements with a post-processing composition.

15. The method of claim 1, wherein the functionalizing agent comprises at least one agent of a colorant, a dye, a pigment, a fiber, a hardening agent, a metal powder, an inorganic pigment or powder, an electrostatic discharge agent, a filler, a base, a finishing agent, and/or a plasticizer.

16. The method of claim 1, wherein a colorant or dye solution is applied having a temperature in the range of about 50 to about 95° C., wherein the temperature is maintained over the treatment period or is increased or decreased continuously or incrementally.

17. The method of claim 1, wherein the element has been obtained by a sintering/melting process selected from the group consisting of a multi-jet fusion process (MJF), a selective laser sintering process (SLS), a high-speed sintering process (HSS), a binder-jetting process, and a light induced process.

18. The method of claim 1, wherein the polymer is polyamide selected from the group consisting of polyamide 6 (PA6), polyamide 6.6 (PA6.6), polyamide 11 (PA11), polyamide 12 (PA12), PA 4.6 (PA4.6), polyamide 612 (PA612), polyphthalamide (PPA); a thermoplastic polyamide or co-polyamide, and a blended or filled polyamide, or a copolymer, blend, or mixture thereof, polymethyl methacrylate (PMMA), polyoxy methylene (POM), polyethylene terephthalate (PET), polyether block amide (PEBA), poly carbonate (PC), polyethylene furanoate (PEF), polylactide (PLA), polyvinylchloride (PVC), thermoplastic polyurethane (TPU), thermoplastic polyamides (TPA), thermoplastic copolyester compounds (TPC), polyurethane, polysulfone, polyetherimide (PEI), styrene polymer or copolymer, or a thermoplastic polymer comprising polyetherimide and polycarbonate, or copolymers, blends, or mixtures of these polymers.

19. The method of claim 1, wherein a treatment agent recovery step is carried out by removing treating agent with a filtration unit with absorbed solvent and desorbing the solvent.

20. The method of claim 1, wherein the treating agent is applied until the surface roughness has been reduced by 2 to 20 μm and the resultant element surface roughness Ra is from 0.3 to 10 μm.

21. The method of claim 1, wherein the treating agent is in gaseous form.

* * * * *